United States Patent [19]

Kohlstruk et al.

[11] Patent Number: 6,093,817

[45] Date of Patent: Jul. 25, 2000

[54] PROCESS FOR PREPARING A REDUCED-COLOR ISOCYANURATE-FUNCTIONAL POLYISOCYANATE PREPARED FROM 1-ISOCYANATO-3,3,5-TRIMETHYL-5-ISOCYANATOMETHYLCYCLOHEXANE (IPDI)

[75] Inventors: Stephan Kohlstruk, Recklinghausen; Jansen Volker, Moers; Rainer Lomoelder, Muenster, all of Germany

[73] Assignee: Huels Aktiengesellschaft, Marl, Germany

[21] Appl. No.: 09/222,733

[22] Filed: Dec. 29, 1998

[30] Foreign Application Priority Data

Dec. 29, 1997 [DE] Germany .................... 197 58 050

[51] Int. Cl.[7] ................................................ C07D 251/32
[52] U.S. Cl. .......................... 544/193; 560/344; 528/48; 528/67
[58] Field of Search ................ 528/67, 48; 544/193; 560/344

[56] References Cited

U.S. PATENT DOCUMENTS

| | | | |
|---|---|---|---|
| 3,995,997 | 12/1976 | Boehmke et al. | 8/527 |
| 4,288,586 | 9/1981 | Bock et al. | 528/67 |
| 4,454,317 | 6/1984 | Disteldorf et al. | 544/193 |
| 4,596,679 | 6/1986 | Hellbach et al. | 560/344 |
| 5,436,336 | 7/1995 | Bruchmann et al. | 544/193 |
| 5,798,431 | 8/1998 | Brahm et al. | 528/45 |

*Primary Examiner*—Paul J. Killos
*Assistant Examiner*—Taylor V. Oh
*Attorney, Agent, or Firm*—Oblon, Spivak, McClelland, Maier & Neustadt, P.C.

[57] ABSTRACT

A reduced-color isocyanurate-functional polyisocyanate is prepared by partially trimerizing 1-isocyanato-3,3,5-trimethyl-5-isocyanatomethylcyclohexane (IPDI) having a low total chlorine content of less than 80 mg/kg in the presence of a catalyst, thereby resulting in a product isocyanurate-functional polyisocyanate having a content of free NCO groups of between 10 and 22% and a residual monomer content of less than 0.7%.

10 Claims, No Drawings

PROCESS FOR PREPARING A REDUCED-COLOR ISOCYANURATE-FUNCTIONAL POLYISOCYANATE PREPARED FROM 1-ISOCYANATO-3,3,5-TRIMETHYL-5-ISOCYANATOMETHYLCYCLOHEXANE (IPDI)

BACKGROUND OF THE INVENTION

1. Field of the Invention

The present invention relates to a process for continuous preparation of a reduced-color isocyanurate-functional polyisocyanate prepared from 1-isocyanato-3,3,5-trimethyl-5-isocyanatomethylcyclohexane (IPDI).

2. Description of the Background

For high-quality one- and two-component polyurethane coating materials of high light stability and weather resistance, the isocyanate component employed comprises, in particular, polyisocyanate mixtures comprising isocyanurate groups and uretdione groups. These products are preferably prepared by catalytic oligomerization of (cyclo) aliphatic diisocyanates, examples of which are 1-isocyanato-3,3,5-trimethyl-5-isocyanatomethylcyclohexane (IPDI) and 1,6-diisocyanatohexane (HDI).

Catalysts which can be employed to facilitate the oligomerization reaction include tertiary amines, phosphines, alkali metal phenolates, aminosilanes, quaternary ammonium hydroxides or quaternary ammonium carbonates. Other highly suitable oligomerization catalysts include hydroxides, halides and carboxylates of hydroxyalkylammonium ions; alkali metal salts; and the tin, zinc and lead salts of alkylcarboxylic acids. Depending on the catalyst the use of various cocatalysts is also possible such as OH-functionalized compounds or Mannich bases formed from secondary amines and aldehydes and/or ketones, for example.

The (cyclo)aliphatic diisocyanates are oligomerized by allowing them to react in the presence of the catalyst, with or without the use of solvents and/or auxiliaries, until the desired conversion has been reached. The reaction is then terminated by deactivating the catalyst and the excess monomeric diisocyanate is removed by distillation. Deactivation takes place by means of heat or by adding a catalyst inhibitor to the reaction. Depending on the type of catalyst used and on the reaction temperature, the resulting polyisocyanates have varying proportions of isocyanurate and/or uretdione groups.

The majority of the products prepared in this manner are clear, but depending on the type of catalyst, quality of diisocyanate, temperature of reaction and mode of reaction they may show a more or less pronounced yellow coloration. For the preparation of high-quality polyurethane coating materials, however, it is important that the products have an extremely low color number.

Organic polyisocyanates such as aromatic, cycloaliphatic and aliphatic polyisocyanates with a functionality of two or more, can be prepared by various methods (Annalen der Chemie 562 (1949), pages 75ff). One method which is particularly established in industry is the preparation of organic polyisocyanates by phosgenating organic polyamides to give the corresponding polycarbamic chlorides and thermally cleaving these chlorides into organic polyisocyanates and hydrogen chloride. This method of preparation has been utilized exclusively in industry for a long time.

Problems associated with this procedure are the high conversion of chlorine to hydrogen chloride by way of phosgene and carbamic chloride, the toxicity of the phosgene and the associated cost-intensive safety measures, the corrosiveness of the reaction mixture, the lability of the solvents commonly employed and the formation of chlorine-containing and chlorine-free byproducts, which are codeterminants of the physical properties of the product such as the color, viscosity and vapor pressure, and of the chemical properties, such as reactivity and storage life of the polyisocyanates. The known phosgenation products of aniline-formaldehyde condensates (crude polyisocyanate mixtures of the diphenylmethane series), for example, include a large number of impurities. According to Chem. Soc. Rev. 3 (1974) page 209 ff., these impurities principally comprise chlorine-containing contaminants, which always cause fluctuations in activity when the chlorine involved is "highly mobile", so-called hydrolyzable chlorine.

With the objective of circumventing the problems associated with chlorine, numerous experiments have been conducted to prepare organic polyisocyanates without the use of phosgene, i.e. phosgene-free processes. According to EP 0 126 299 (U.S. Pat. No. 4,596,678), EP 0 126 300 (U.S. Pat. No. 4,596,679) and EP 0 355 443 (U.S. Pat. No. 5,087,739) it is possible to prepare (cyclo)aliphatic diisocyanates such as 1,6-hexamethylene diisocyanate (HDI) and/or isomeric aliphatic diisocyanates having 6 carbon atoms in the alkylene radical and 1-isocyanato-3-isocyanatomethyl-3,5,5-trimethylcyclohexane (isophorone diisocyanate or IPDI) in circulation processes, by reacting the (cyclo)aliphatic diamines with urea and alcohols and with any N-unsubstituted carbamic esters, dialkyl carbonates and other byproducts recycled from the reaction process to give (cyclo)aliphatic biscarbamic esters and then thermally cleaving these esters into the corresponding diisocyanates and alcohols.

The diisocyanates HDI and IPDI prepared by the phospene-free process will be referred to below as HDI (urea) and IPDI (urea), respectively.

Like the products of the phosgene process, the polyisocyanates prepared by a chlorine-free technique are also subject to problems. It is reported that (cyclo)aliphatic polyiso-cyanates obtainable by the phosgene-free process, especially by thermal cleavage of (cyclo)aliphatic polycarbamic esters, are not stable on storage (EP 0 645 372). Their instability is attributed to the absence of hydrolyzable chlorine compounds and to the presence of catalytic impurities of unknown structure that promote, for example, the formation of oligomers. At low temperatures, for example at ±5° C. and below, hexamethylene diisocyanate (HDI (urea)), for example, tends to form linear HDI oligomers having a nylon 1 structure. The resulting increase in molecular weight, which is associated with an increase in viscosity, may lead to the gelling of the polyisocyanate, e.g. HDI (urea). Products of this kind can no longer be reacted reproducibly to give polyisocyanate polyaddition products. At higher storage temperatures, for example, the reactivity of HDI prepared by phosgene-free processes, especially in the case of the trimerization reaction catalyzed with quaternary ammonium hydroxide compounds, decreases sharply. Intensely colored, isocyanurate-functional polyisocyanates are obtained which can no longer be utilized especially as a base material for coating.

Both processes for preparing organic polyisocyanates, i.e., both the phosgenation process and the phosgene-free process via polycarbamic esters, therefore, give products which are problematic when further processed into isocyanurate-functional polyisocyanate mixtures as are employed in high-quality one- and two-component polyurethane coating materials. The cause of this lies in preparation-related byproducts of, in many cases, unknown structure, or else in a preparation-related deficit of certain byproducts which influence the shelf life, reactivity and color of the composition and whose effects extend into corresponding successor products, thereby hindering reproducible and hence economic use.

Isocyanurate-functional polyisocyanate prepared from 1-isocyanato-3,5,5-trimethyl-5-isocyanatomethylcyclohexane (IPDI) is obtained industrially in a continuous process by partial trimerization of IPDI and subsequent separation of the excess monomer by short-path evaporation (EP 0 017 998, U.S. Pat. No. 4,454,317). The trimerization takes place in the presence of quaternary ammonium carboxylates.

For the technical trimerization of IPDI the grade of IPDI employed to date has been that as obtained by phosgenation of isophoronediamine (DE 12 02 785). This standard IPDI contains 100–400 mg/kg of total chlorine, of which the hydrolyzable chlorine content is 80–200 mg/kg. The final product, which has been freed from monomer, is obtained as a solid resin. 70% strength solutions of this resin in butyl acetate are clear and have a pale yellow coloration. The color numbers of such solutions lie within a spectrum of between 70 and 150 Hazen, although similar color numbers are obtained in solvents with aromatic components. If production is continued over a relatively long period, two principal phenomena are observed: firstly, there is a continuous buildup within the production unit of unwanted deposits of undefined composition, which necessitate regular cleaning of the unit, a process which is evidently neutral neither in terms of time nor cost. Secondly, the color quality of the product is subject to gradual impairment, in other words, the color numbers show a trend toward higher values along the time axis. Such a trend, however, is disadvantageous, since only products having an extremely low color number are desired for the preparation of high-quality polyurethane coating materials and coatings. A need continues to exist for an improved method of preparing low colored isocyanurate-functional polyisocyanate.

SUMMARY OF THE INVENTION

Accordingly, one object of the present invention is to provide a process for preparing an isocyanurate-functional polyisocyanate from 1-isocyanato-3,3,5-trimethyl-5-isocyanatomethylcyclohexane (IPDI) which especially has a low color number and does not have the deficiencies referred to above.

Briefly, this object and other objects of the invention as hereinafter will become more readily apparent can be attained by a process for preparing a reduced-color isocyanurate-functional polyisocyanate by partially trimerizing 1-isocyanato-3,3,5-trimethyl-5-isocyanatomethylcyclohexane (IPDI) having a low total chlorine content of less than 80 mg/kg in the presence of a catalyst, thereby resulting in a product isocyanurate-functional polyisocyanate having a content of free NCO groups of between 10 and 22% and a residual monomer content of less than 0.7%.

DETAILED DESCRIPTION OF THE PREFERRED EMBODIMENTS

It has now been surprisingly found that the objectives of the invention can be realized by trimerizing low-chlorine content IPDI, which can be obtained alternatively by complex distillative purification of a standard IPDI having a total chlorine content of 100–400 mg/kg, by blending said standard IPDI with IPDI (urea), or else by completely replacing standard IPDI by IPDI (urea).

In a preferred embodiment of the invention, a reduced-color isocyanurate-functional polyisocyanate is prepared by continuously partially trimerizing 1-isocyanato-3,3,5-trimethyl-5-isocyanatomethylcyclohexane (IPDI) in a reaction coil within a temperature range of 40–120° C., preferably 60–90° C., and only up to a conversion of 45%, in the presence of from 0.02–0.1% by weight, based on the weight of the IPDI, of a quaternary ammonium carboxylate and/or ammonium hydroxide catalyst of the formula:

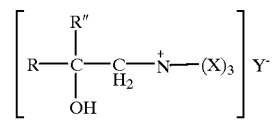

wherein Y$^-$=R'COO— or OH—, and wherein the radicals X independently of one another are identical or different (cyclo)aliphatic, araliphatic or heterocyclic hydrocarbon radicals and where two radicals X together with the quaternary nitrogen may form a ring with or without one or more heteroatoms, or three radicals X together with the quaternary nitrogen and a heteroatom which they have in common may form a bicyclic ring, R and R" independently of one another are hydrogen or a radical from the group alkyl, cycloalkyl and aralkyl having 1–12 carbon atoms, terminating the reaction and removing the unreacted IPDI by thin-film evaporation. The isocyanurate-functional polyisocyanate has a content of free NCO groups of between 10 and 22% and a residual monomer content of less than 0.7%. The IPDI reactant is a low chlorine content IPDI.

Under customary reaction conditions the trimerization can be conducted within 1–60 minutes. Compounds are obtained which have one or more isocyanurate rings. Compounds of this kind are described in the literature.

With particular preference, the trimerization is conducted continuously as described below.

In accordance with the invention the trimerization of low-chlorine IPDI is conducted in a continuously operating reaction coil with continuous, simultaneous metered addition of the diisocyanate and of the trimerization catalyst at 40–120° C. and over the course of 1–7 minutes. A reaction coil with a small diameter produces high flow rates. Furthermore, it is highly advantageous to heat the diisocyanate/catalyst mixture to about 60° C. before its entry into the reaction coil.

The reaction coil can, for example, also be divided into 2–3 zones which can be heated or, if desired, cooled entirely independently of one another, with preheating of the feedstocks—diisocyanate and catalyst—to reaction temperature taking place in the first zone, maintenance of the reaction temperature taking place in the second zone by partial dissipation of the heat of reaction, and the cooling of the reaction mixture taking place in the third zone. Where the reaction mixture is to be supplied directly to the thin-film distillation stage without being stored beforehand, the cooling in the third zone can be omitted.

A critical factor in this continuous preparation of trimerized diisocyanates is the use of a low-chlorine grade IPDI. Surprisingly, it is possible using this specific diisocyanate to prevent or to drastically retard the continuous buildup of deposits in the unit, which may result in a change in the unit parameters and operating parameters within a marked range of fluctuation. Surprisingly, moreover, reduced color products are obtained when a low-chlorine grade is employed. In this context—for example when changing from standard IPDI to IPDI(urea)—there is an interesting effect: the color number of the product first of all rises sharply and then falls to a consistently low level. Also critical is the metered addition of the catalyst. It has been found particularly judicious to mix the starting materials thoroughly before their entry into the reaction coil.

The temperature of the reaction coil sections is judiciously selected such that the preheating zone is at about 40–60° C., the reaction zone 70–120° C., preferably 70–90° C., and the cooling zone 20–40° C. Then, with a throughput of 40–120 kg/h diisocyanate per 0.5 $cm^2$ of reactor cross-section, a diisocyanate conversion of about 35–45% can be achieved. These temperature conditions, however, must in each case be adapted to the conditions necessary for the diisocyanate that is to be trimerized.

The residence time of the diisocyanate/catalyst mixture in the reaction coil is about 1–7 minutes. Within this period a conversion of about 35–45% is realized. To remove the unreacted diisocyanate the reaction mixture is subjected to short-path evaporation. For more precise metering of the small amounts of catalyst and for generating a better quality of thorough mixing it can be advantageous to dissolve the catalyst in an appropriate organic solvent. Solvents suitable in principle are those in which the catalyst is readily soluble. Preferably, however, the use of solvents is largely avoided.

The isocyanurate-functional isocyanurates prepared in accordance with the invention represent useful intermediates for polyurethane coatings, such as leather and textile coatings, and for polyurethane dispersions and adhesives, and are particularly useful as the polyisocyanate component in one- and two component polyurethane systems for weather-resistant and light-stable polyurethane coating materials.

Having now generally described the invention, a further understanding can be obtained by reference to certain specific examples which are provided herein for purpose of illustration only and are not intended to be limiting unless otherwise specified.

A. Starting Polyisocyanates

Polyisocyanate 1

Standard IPDI having a purity of >99.5%, an NCO content of 37.7%, a viscosity at 23° C. of 14 mPa s and a total chlorine content of about 180 mg/kg (of which about 120 mg/kg is hydrolyzable chlorine).

Polyisocyanate 2

IPDI(urea), chlorine-free, having a purity of >99.6%, an NCO content of 37.7% and a viscosity at 23° C. of 15 mPa s.

B. Continuous Preparation

The continuous preparation of partially trimerized diisocyanates (conversions up to about 35–45%) takes place in a tubular coil reactor at 60–120° C. and with a residence time of about 1–7 minutes, the reactor consists of two heating zones and one cooling zone, the preheating of the feedstocks (diisocyanate+catalyst) to reaction temperature taking place first of all in the first heating zone, and the reaction temperature being held at this temperature by partial dissipation of the heat of reaction in the second zone.

The diisocyanate/catalyst mixtures, intensively mixed in a premixer, enter the first heating zone, which is heated with hot oil at 80–90° C., at a temperature of about 30° C. After passing through the first heating zone, the diisocyanate/catalyst mixtures have already undergone 7–10% trimerization with a residence time of about 0.8–1.5 minutes. The further conversion from 7–10% to a maximum of 35–45% takes place in the second heating zone at 80–90° C. Here, about 84 kJ/kg of throughput require dissipation. After leaving the tubular coil reactor, the trimer has an NCO content which corresponds to a conversion of 35–45%, and is supplied directly to a stage of monomer separation by short-path evaporation. The separation takes place continuously under reduced pressure in a preliminary and a main evaporator stage, with the distillates being recycled and used again for the trimerization.

C. Comparison of the Results

The starting polyisocyanates were subjected as described under section (B.) to a continuous trimerization over a period of several days. During this period, the color quality of the demonomerized product was checked at regular intervals. In the case of the chlorine-containing polyisocyanate 1 a continuous buildup in color is found, whereas the trend for the color quality of the product obtained from polyisocyanate 2 it time-independent.

TABLE 1

Conversion of polyisocyanate 1

| Time [d] | Average starting-material-stream [kg/h] | Average product stream [kg/h] | Color number [Hazen] |
|---|---|---|---|
| 1 | 28.2 | 8.5 | 73 |
| 2 | 30.7 | 9.2 | 82 |
| 4 | 27.9 | 8.4 | 96 |
| 6 | 33.1 | 9.9 | 119 |
| 8 | 32.2 | 9.7 | 136 |

TABLE 2

Conversion of polyisocyanate 2

| Time [d] | Average starting-material-stream [kg/h] | Average product stream [kg/h] | Color number [Hazen] |
|---|---|---|---|
| 1 | 31.6 | 9.4 | 48 |
| 2 | 31.1 | 9.3 | 57 |
| 4 | 29.2 | 8.8 | 53 |
| 6 | 30.4 | 8.8 | 61 |
| 8 | 29.7 | 8.9 | 52 |

The disclosure of German priority application number 197 50 050.5 filed Dec. 29, 1997 is hereby incorporated by to the present application.

Obviously, numerous modifications and variations of the present invention are possible in light of the above teachings. It is, therefore, to be understood that within the scope of the appended claims, the invention may be practiced otherwise than as specifically described herein.

What is claimed as new and is desired to be secured by Letters Patent is:

1. A process for preparing a reduced-color isocyanurate-functional polyisocyanate, which comprises:

partially trimerizing 1-isocyanato-3,3,5-trimethyl-5-isocyanatomethylcyclohexane (IPDI) having a low total chlorine content of less than 80 mg/kg in the presence of a catalyst, thereby resulting in a product isocyanurate-functional polyisocyanate having a content of free NCO groups of between 10 and 22% and a residual monomer content of less than 0.7%.

2. The process as claimed in claim 1, wherein the catalyst employed is selected from the group consisting of tertiary amines, phosphines, alkali metal phenolates, amino silanes, quaternary ammonium hydroxides, quaternary ammonium carbonates; hydroxides, halides or carboxylates of hydroxy-alkylammonium ions; alkali metal salts; and tin, zinc or lead salts of alkylcarboxylic acids.

3. The process as claimed in claim 2, wherein the catalyst is a quaternary ammonium carboxylate and/or hydroxide of the formula:

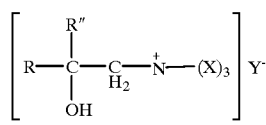

wherein Y⁻=R'COO— or OH—; radicals X, independently of one another, are identical or different (cyclo)aliphatic, araliphatic or heterocyclic hydrocarbon radicals, where two radicals X together with the quaternary nitrogen optionally form a ring with or without one or more heteroatoms, or three radicals X together with the quaternary nitrogen and via a heteroatom which they have in common optionally form a bicyclic ring, R and R" independently of one another are hydrogen or a radical selected from the group consisting of alkyl, cycloalkyl and aralkyl having 1–12 carbon atoms, the trimerization catalyst being employed in an amount of from 0.02–0.1% by weight, based on the weight of the IPDI, and the trimerization continuously being conducted in the reaction coil within a temperature range of 40–120° C. and only up to a conversion of 45%, and wherein the reaction is terminated followed by removing the unreacted IPDI by thin-film evaporation.

4. The process as claimed in claim 1, wherein trimerization is conducted with a low-chlorine content IPDI having a total chlorine content of less than 80 mg/kg which is obtained by distillative purification of standard IPDI.

5. The process as claimed in claim 1, wherein trimerization is conducted by with a low-chlorine IPDI having a total chlorine content of less than 80 mg/kg which is obtained by blending IPDI(urea) with standard IPDI.

6. The process as claimed in claim 1, wherein trimerization is conducted with IPDI(urea).

7. The process as claimed in claim 3, wherein the reaction coil has a preheating zone, a reaction zone and a cooling zone.

8. The process as claimed in claim 7, wherein the preheating zone has a temperature of about 40–60° C., the reaction zone has a temperature of about 70–120° C. and the cooling zone has a temperature of about 20–40° C.

9. The process as claimed in claim 8, wherein the throughput of diisocyanate reactant in the reactor is 40–120 kg/h per 0.5 cm² cross-section, resulting in a diisocyanate conversion of about 35–45%.

10. The process as claimed in claim 3, wherein the residence time of the diisocyanate/catalyst mixture in the reaction coil is 1–7 minutes.

* * * * *